Figure 1:
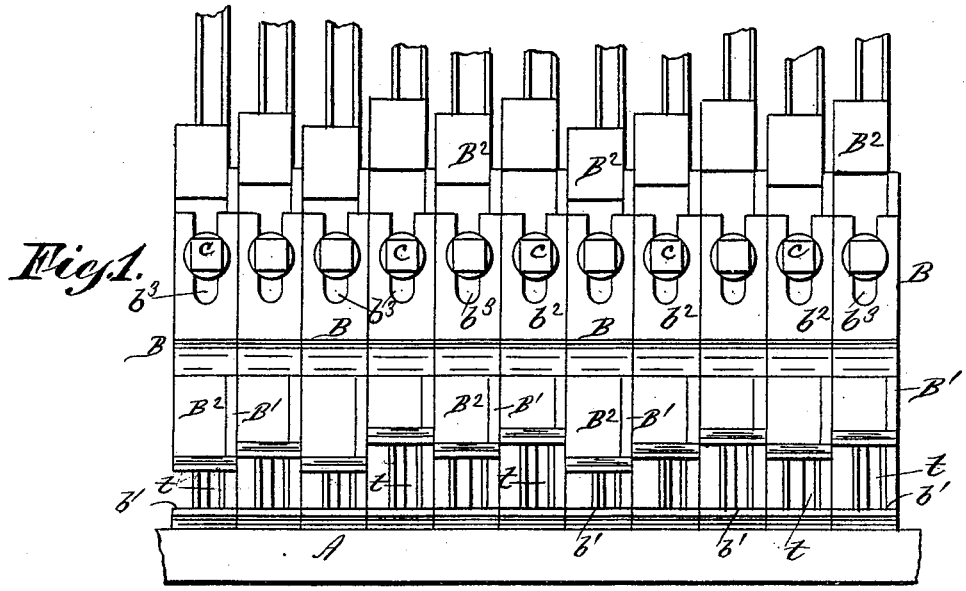

(No Model.) 5 Sheets—Sheet 1.

L. K. JOHNSON & A. A. LOW.
TYPE SETTING APPLIANCE.

No. 583,480. Patented June 1, 1897.

Witnesses:
D. W. Gardner.
A. N. Fellows.

Inventors:
Louis Kossuth Johnson
Abbot Augustus Low
By their Attorney
George William Miatt

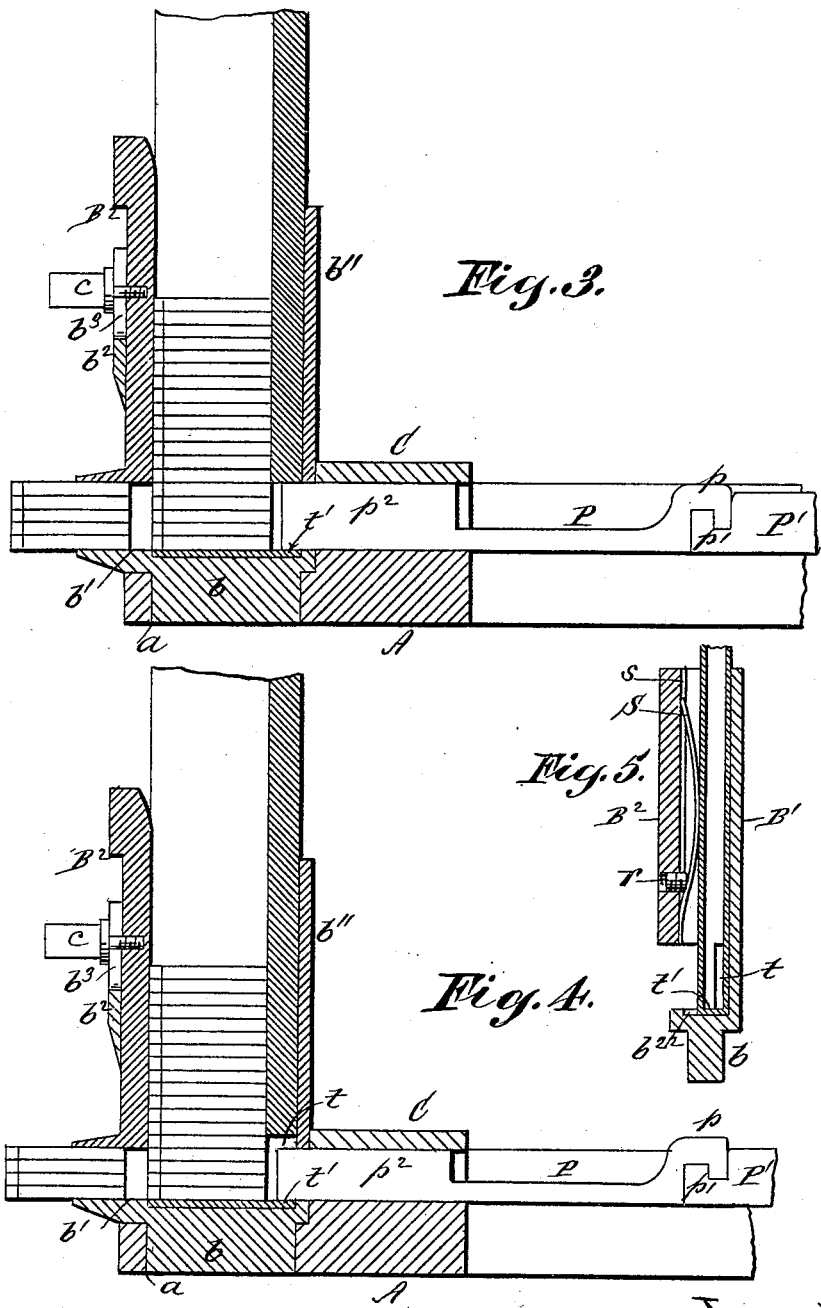

(No Model.)   L. K. JOHNSON & A. A. LOW.
TYPE SETTING APPLIANCE.

No. 583,480.   Patented June 1, 1897.

(No Model.) 5 Sheets—Sheet 4.
L. K. JOHNSON & A. A. LOW.
TYPE SETTING APPLIANCE.
No. 583,480. Patented June 1, 1897.
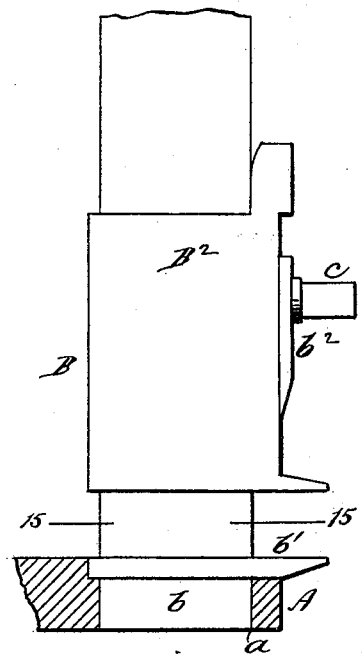
Fig. 8.
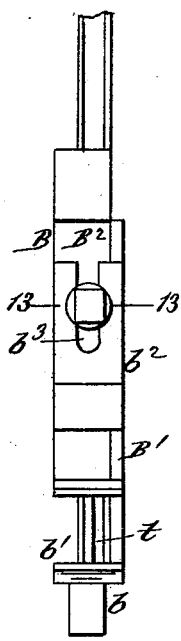
Fig. 9.
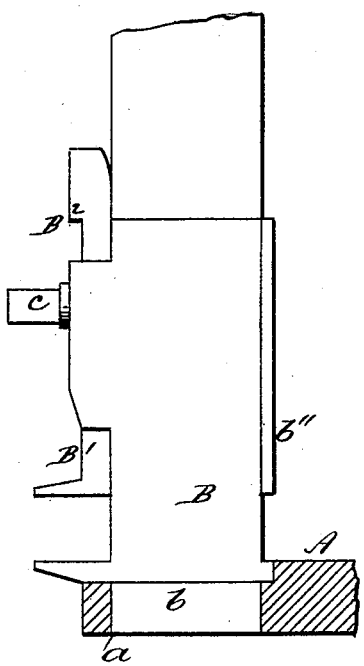
Fig. 10.
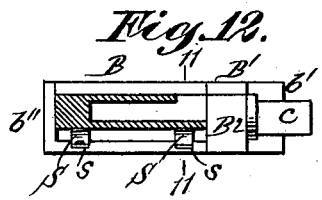
Fig. 12.
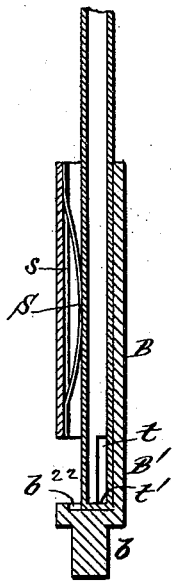
Fig. 11.
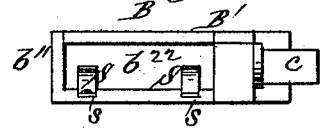
Fig. 14.
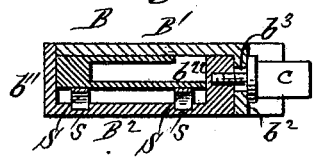
Fig. 13.
Fig. 15.
Witnesses:
D. W. Gardner
A. N. Fellows
Inventors:
Louis Kossuth Johnson
Abbot Augustus Low
By their Attorney
George William Miatt
THE NORRIS PETERS CO., PHOTO-LITHO., WASHINGTON, D. C.

(No Model.) 5 Sheets—Sheet 5.

L. K. JOHNSON & A. A. LOW.
TYPE SETTING APPLIANCE.

No. 583,480. Patented June 1, 1897.

Witnesses:
A. W. Gardner,
A. N. Fellows

Inventors:
Louis Kossuth Johnson
Abbot Augustus Low.
By their Attorney
George William Miatt

UNITED STATES PATENT OFFICE.

LOUIS KOSSUTH JOHNSON AND ABBOT AUGUSTUS LOW, OF BROOKLYN, NEW YORK, ASSIGNORS TO THE ALDEN TYPE MACHINE COMPANY, OF NEW YORK, N. Y.

TYPE-SETTING APPLIANCE.

SPECIFICATION forming part of Letters Patent No. 583,480, dated June 1, 1897.

Application filed April 20, 1896. Serial No. 588,275. (No model.)

*To all whom it may concern:*

Be it known that we, LOUIS KOSSUTH JOHNSON and ABBOT AUGUSTUS LOW, citizens of the United States, residing in the city of Brooklyn, in the county of Kings and State of New York, have invented certain new and useful Improvements in Type-Setting Appliances, of which the following is a specification sufficient to enable others skilled in the art to which the invention appertains to make and use the same.

Our improvements relate to the form of setter-case described in our application filed January 30, 1896, Serial No. 577,440, in which a series of interchangeable channel-holders fit into or upon a common table or support. In that case the holders were designed for a single prescribed size of type-containing channel which alone could be properly used in connection therewith.

In a subsequent application, filed March 3, 1896, Serial No. 581,688, we adapted the holder to type-containing channels of different widths, so as to render the case universal in adaptation by making the sides of the holder adjustable laterally or horizontally with relation to each other, as well as vertically.

A leading feature of our present invention consists in attaining the same end by other and simpler means, the holder being made of a standard or maximum width and the variations in the width of the channels used being compensated for by yielding springs or cushions on one side wall of the holder, which forces the channel over against the opposite side wall of the holder, the position of the pusher being on that side and the spines of all the channels being slotted on that side to allow the pusher to pass. It will thus be seen that the construction of the type-containing channels themselves is involved in the invention; and a further feature of novelty in this respect consists in forming them with permanent type-supporting floors in conjunction with the floors of the holders, which are countersunk to receive the lower ends of the channels, so as to render the type-supporting surfaces continuous and in proper relation to the pusher.

Another feature of our present invention consists in a novel construction of pusher whereby variations in the number of types to be used may be compensated for. The pusher consists of a comparatively thin plate of a metal which may be readily cut by the ordinary lead or brass-rule cutter used by printers, the front edge and the part of the blade which passes under the types being made of a maximum height—that is, equal to the height of the longest word or combination to be used—and being reduced in height to meet the requirements of words or combinations of less height by shearing off a portion of the upper edge of the pusher-blade.

An incidental feature of our improved construction consists in providing means for adjusting the tension or pressure of the compensating springs which force the channels over against one side wall of the holder, as hereinafter set forth.

Figure 2:
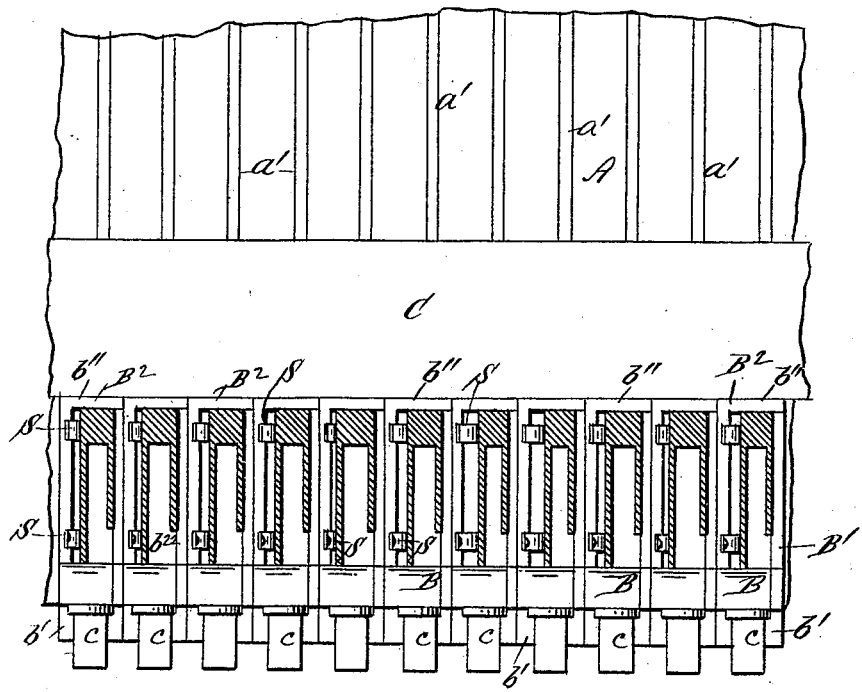
Figure 6:
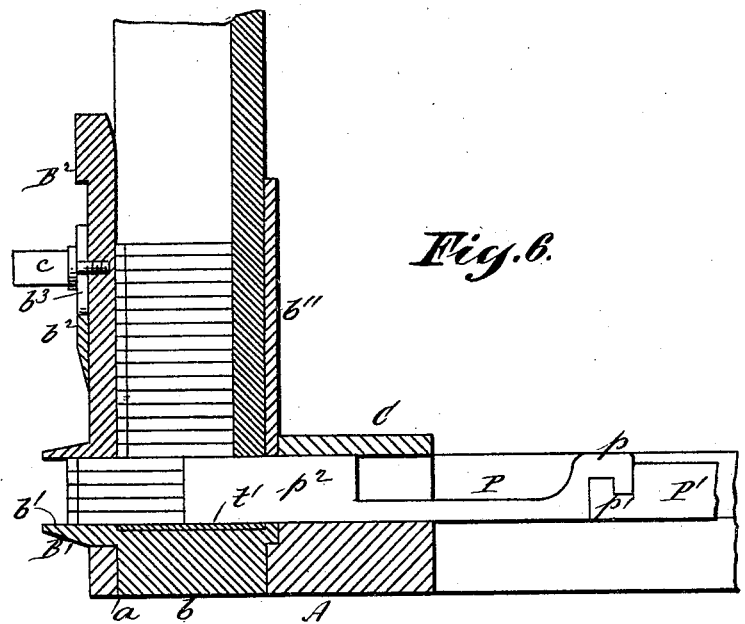
Figure 7:
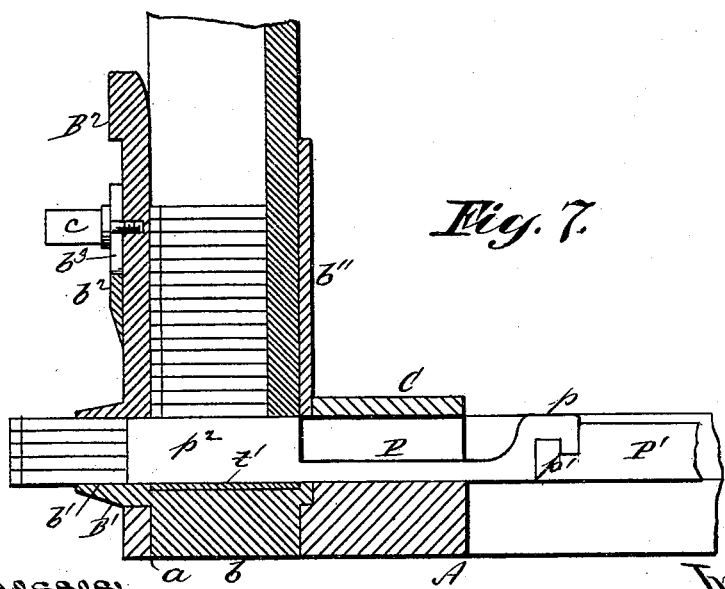
Figure 16:
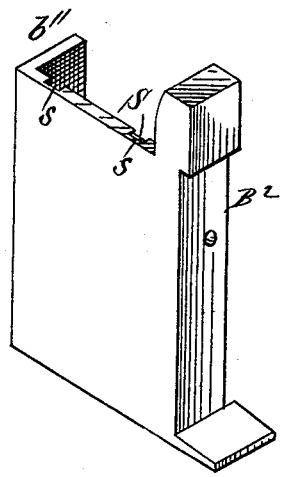
Figure 17:
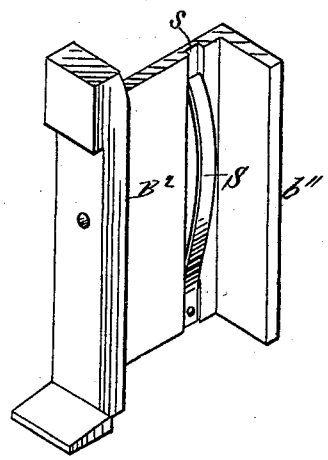
Figure 18:
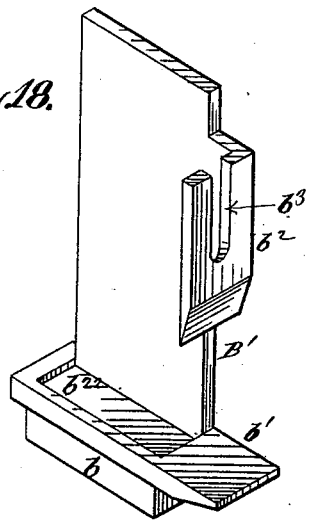
Figure 19:
Figure 20:
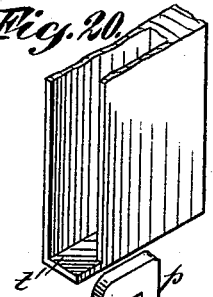
Figure 21:
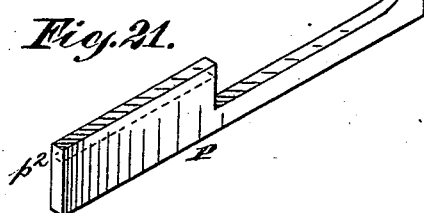

In the accompanying drawings, Figure 1 is a front elevation of a series of channel-holders constructed according to our invention; Fig. 2, a top view of the same, the containing-channels being shown in horizontal section. Fig. 3 is a sectional elevation on a vertical plane through one of the holders and type-containing channels, showing the parts adjusted to a word or combination of maximum height; Fig. 4, a similar view showing the parts adjusted to a word or combination of less than maximum height; Fig. 5, a sectional view showing means for adjusting the springs. Figs. 6 and 7 are similar views showing the parts during the forward stroke of the pusher. Fig. 8 is an elevation of the left-hand side of the holder; Fig. 9, a front elevation thereof; Fig. 10, an elevation of the right-hand side of the holder. Fig. 11 is a vertical section on plane of line 11 11, Fig. 12. Fig. 12 is a top view of the holder, channels, &c. Fig. 13 is a section upon plane of line 13 13, Fig. 9. Fig. 14 is a top view of the holder without the channel. Fig. 15 is a section upon plane of line 15 15, Fig. 8, showing the floor of the holder countersunk for the reception of the lower end of the type-channel. Figs. 16 and 17 are isometrical views of the adjustable part of the holder. Fig. 18 is an isometrical view of the stationary part of the holder. Figs. 19 and 20 are isometrical views of the lower end of a type-containing channel; Fig.

21, an isometrical view of the front end of the pusher.

The bed-plate or table A may be of any desired length, according to the number of words or combinations to be provided for in a single case. Its front portion is formed with a series of equidistant sockets or mortises $a\ a$, coinciding in size and shape with the tenons $b$ on the under side of the holders B. The rear portion of the table A is formed with parallel grooves $a'$ for the reception and guidance of the pusher-blades P and the connecting-blades P', through which the pusher-blades P are actuated by suitable reciprocating mechanism, the forward part of the pusher being held in place by a common cap C.

The rear end of each pusher-blade is formed to engage with the front end of the reciprocatory connecting-blade P' in any suitable manner, preferably by means that will admit of the removal of the pusher-blade by simply lifting it out of engagement, as by the means shown in the drawings, consisting of the hook or loop $p$, fitting over the hook or projection $p'$ on the reciprocatory blade P'.

The forward portion $p^2$ of the pusher-blade P, or that portion extending back from the front edge a distance at least equal to that of the forward stroke of the pusher for the purpose of sustaining the type in the containing-channel, as shown in Figs. 6 and 7, is made of a height corresponding to that of the maximum number of types to be used in a word or combination, as shown arbitrarily in Figs. 3, 6, and 7, in which the largest word or combination is supposed, for the sake of illustration, to consist of five types. If a particular holder and channel is to be used for a word or combination composed of a less number of types, as in Fig. 4, where four types only are shown, the connecting-blade P' and the pusher-blade P are drawn back until the front edge of the pusher clears the rear end of the cap C, when the pusher-blade is removed and its front portion $p^2$ reduced in height by shearing or otherwise to conform to the new requirement, when it may again be dropped into its groove and into connection with its reciprocatory blade P' and forwarded for action.

The holder B consists of the standard-plate B', formed with the tenon $b$ on its under side below the type-platform $b'$ and having the rectangular flange $b^2$ on its front side projecting transversely across and above the type-platform $b'$.

The adjustable side wall $B^2$ is secured to the standard-plate B' by a thumb-screw $c$ passing through the vertical slot $b^3$ in the rectangular flange $b^2$, and it is formed at its rear with the lateral flange $b^{11}$, which constitutes the rear wall of the holder B.

One portion or side wall of the holder is provided with vertical springs S S. As shown in the drawings, these compensating springs S S are attached to the adjustable side wall $B^2$, the inner surface of which is formed with grooves $s\ s$ for their reception, although such grooves are not absolutely essential. The number of springs to be used on the holder is not material to the invention, one being sufficient to accomplish the result sought, although we prefer to use two or more, in order to hold the channel more steadily in position.

The tension of the springs S may be varied or wear compensated for by means of set-screws $r$, inserted in the side wall when the latter is of sufficient thickness, as shown in Fig. 5.

The distance between the opposed side walls of the holder being equal to or a little greater than the width of the largest channel to be used, it is obvious that the smaller channels, as inserted in the holder, will be pushed over against the opposite side wall of the holder by the springs S, thereby bringing them into proper relation with the pusher-blade, which is situated upon the side opposite to the springs. All the channels, irrespective of size, have the pusher-slots $t$ formed in their spines in a position coinciding to that of the pusher-blade, so that the springs S will cause such slots $t$ to register with the front edge of said pusher-blade whenever the channel is forced down to rest upon the holder-floor $b'$. The lower end of each channel is formed with the type-floor $t'$ below the slot $t$, and the holder-floor is recessed or countersunk, as at $b^{22}$, to receive the lower end of the channel and to bring the type-floor $t'$ into coincidence with the holder-floor $b'$, so as to afford a continuous surface for the advance of the lowest type. By this construction the channels and types may be forced into the holders without special care or attention, since the types are confined and supported by the floor $t'$.

What we claim as our invention, and desire to secure by Letters Patent, is—

1. In a type-setter case substantially such as described the combination of a type-containing channel formed with a type-floor at its lower end, a vertical slot for the pusher above said floor and adjoining one side wall; a channel-holder the floor of which is countersunk to receive the end of the type-containing channel; and a horizontal reciprocatory pusher arranged and operating substantially in the manner and for the purpose described.

2. The combination of the holder B, formed with the springs S, and depression $b^{22}$, the type-containing channel formed with the floor $t'$, and horizontal slot $t$, and the vertical reciprocatory pusher-blade P, arranged and operating substantially in the manner and for the purpose described.

LOUIS KOSSUTH JOHNSON.
ABBOT AUGUSTUS LOW.

Witnesses:
D. W. GARDNER,
GEO. WM. MIATT.